Figure 3:
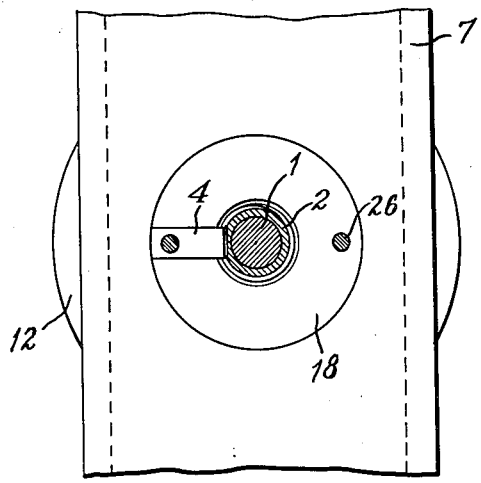

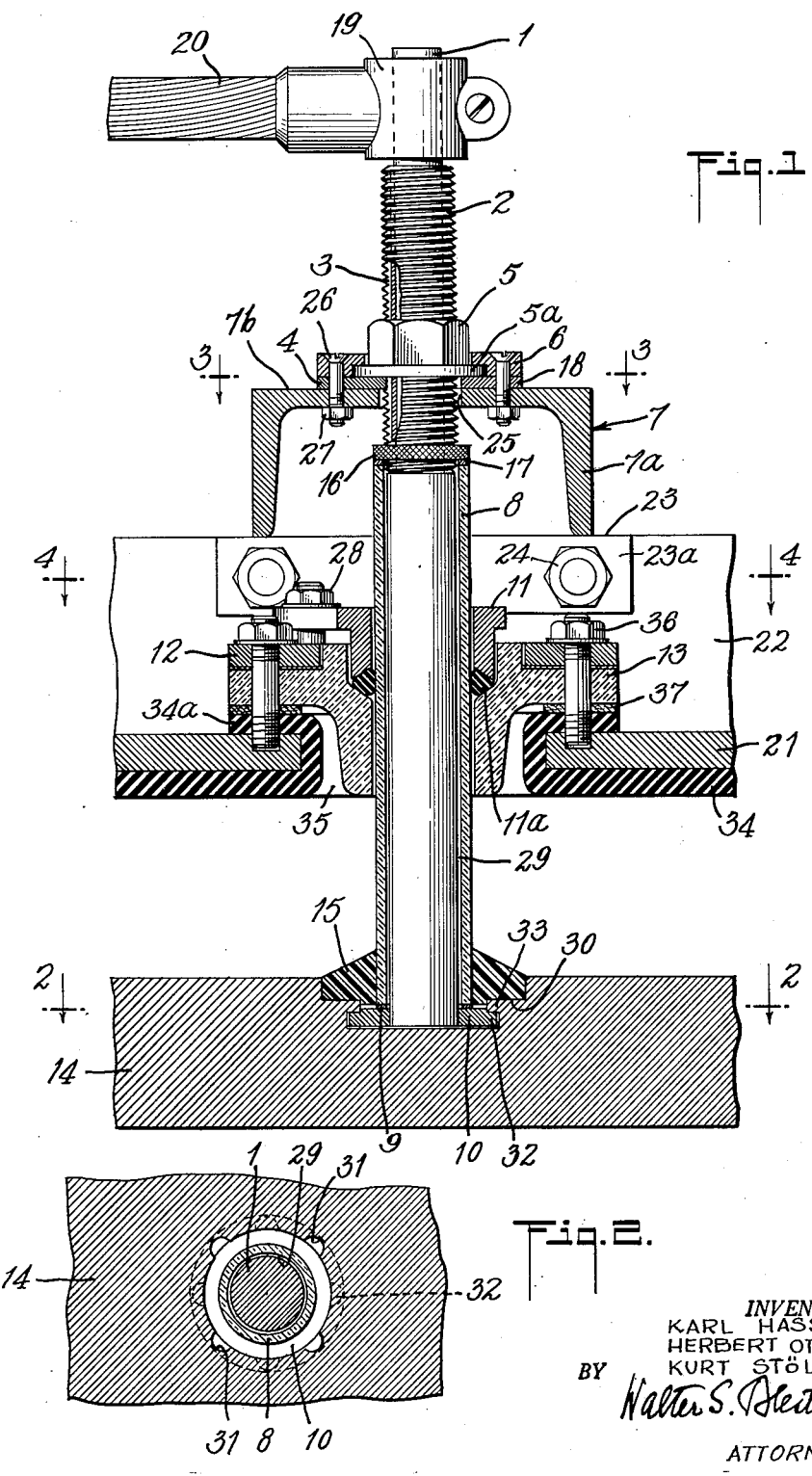
June 5, 1962  K. HASS ET AL  3,037,928
METALLIC CURRENT CONDUCTOR MOUNTING FOR A HORIZONTAL
GRAPHITE ELECTRODE IN AN ELECTROLYTIC CELL
Filed Jan. 19, 1960  3 Sheets-Sheet 1
INVENTORS
KARL HASS
HERBERT OTTERSKY
KURT STÖLZEL
BY Walter S. Hetton
ATTORNEY INVENTORS
KARL HASS
HERBERT OTTERSKY
KURT STÖLZEL
BY Walter S. Olston
ATTORNEY

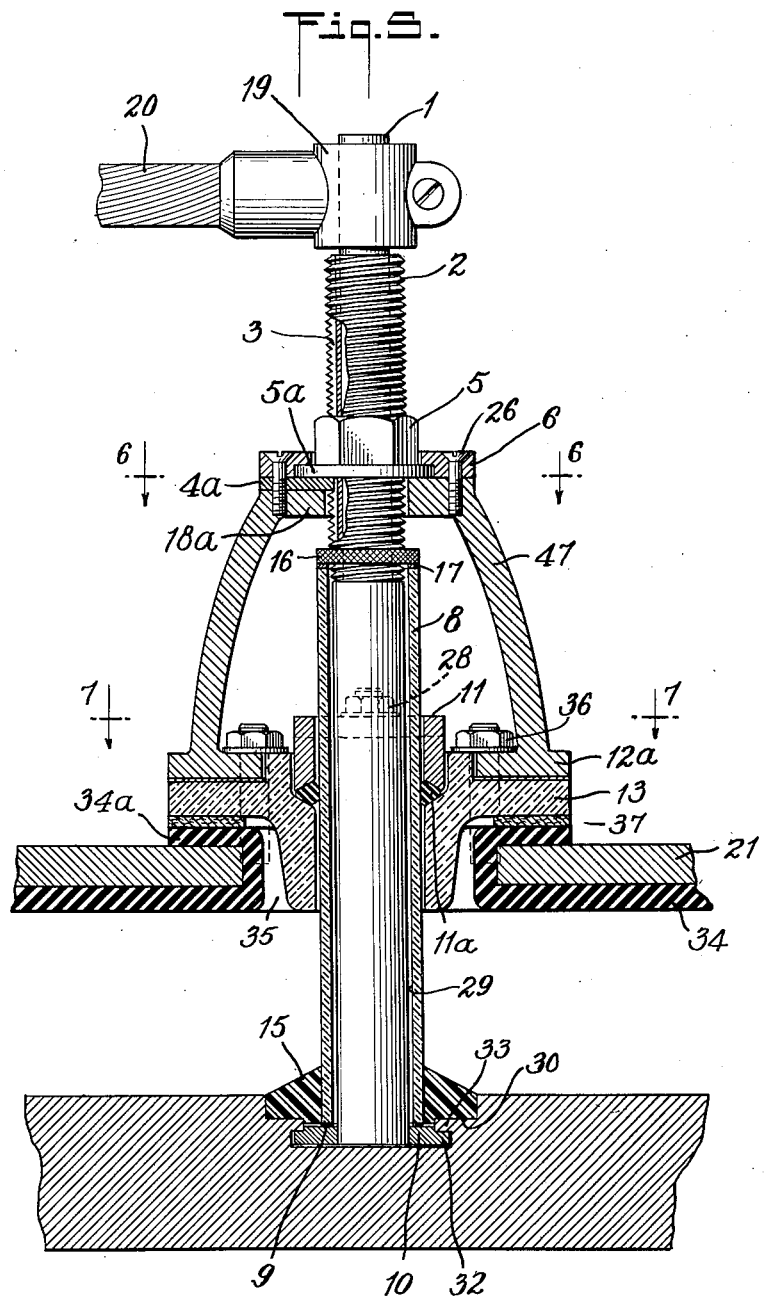

United States Patent Office 3,037,928
Patented June 5, 1962

3,037,928
METALLIC CURRENT CONDUCTOR MOUNTING FOR A HORIZONTAL GRAPHITE ELECTRODE IN AN ELECTROLYTIC CELL
Karl Hass, Lulsdorf uber Troisdorf, Herbert Ottersky, Lulsdorf-Feldmuhle uber Troisdorf, and Kurt Stölzel, Ransel, Siegkreis, Germany, assignors to Feldmuhle Papier- und Zellstoffwerke Aktiengesellschaft, Dusseldorf-Oberkassel, Germany
Filed Jan. 19, 1960, Ser. No. 3,409
Claims priority, application Germany Feb. 14, 1959
5 Claims. (Cl. 204—286)

The present invention relates to the current conductor for a substantially horizontal graphite electrode in an electrolytic cell, for instance cells with a graphite anode, a mercury cathode and an alkali or alkaline earth metal chloride electrolyte.

The current conductor has been conventionally used also as the electrode support and, therefore, should have a minimum electrical resistance to serve as an effective conductor and the necessary mechanical rigidity to support the anode plate. Furthermore, it has been proposed to provide such electrode mountings with means for adjusting the position of the electrode during operation of the cell, which is necessitated by the wear of the electrode. The mounting must, of course, be inert to the fluids in the cell.

Hithertofore, graphite rods have been used as current conductors and supports for graphite electrodes. The rod was, for instance, threadedly joined with the electrode plate or the connection was established by a conical joint. Graphite is sufficiently inert to the cell fluids and the conductivity of the rod was increased by providing one or more axial bores in the rod and soldering copper wires to the graphite rod in its axial bores. These devices have two major disadvantages. First, an increased resistance at the juncture between the graphite support rod and the graphite electrode plate is unavoidable. Secondly, new support rods must be used each time or every other time the electrode plate is changed.

It is a primary object of the present invention to eliminate these disadvantages and to provide a mounting for a horizontal graphite electrode, which constitutes an excellent current conductor and a firm support, and whose parts are very frequently re-usable.

This object is accomplished in accordance with this invention by a metallic current conductor whose lower end is soldered to the graphite plate while its upper end extends through a port in the electrolytic cell cover outwardly of the cell. The metallic conductor is partially surrounded by a rigid protective sleeve which defines an annular expansion chamber with the conductor and which is of a heat-insulating material substantially inert to fluids in the cell, for instance porcelain or a suitable plastic. The lower end of the protective sleeve is joined to the graphite plate by an inert cement and the upper sleeve end extends through the cover port. A cell sealing means, for instance a stuffing box, is provided in the cover port and surrounds the protective sleeve below its upper end.

In such an arrangement, the metallic current conductor as well as the protective sleeve may be used over and over again when the electrode plate is changed, even if a short circuit during electrolysis has caused a temporary over-heating of the conductor and a corresponding expansion of the conductor, which is possible in the expansion chamber without damage to the protective sleeve. In addition, the air in the expansion chamber protects the sleeve against excessive heating.

Figure 4:
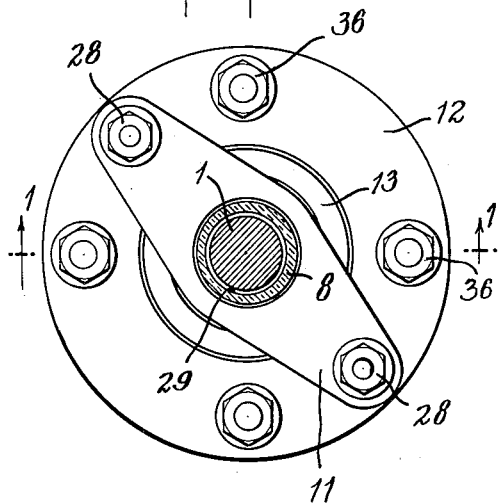
Figure 6:
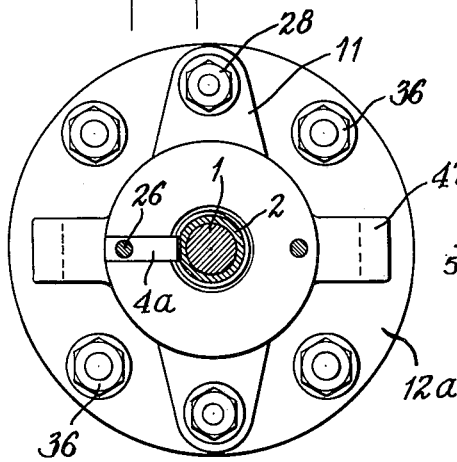
Figure 7:
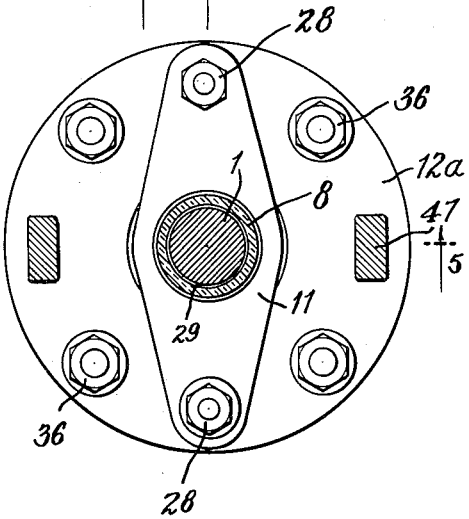

The above and other objects, features and advantages of the present invention will be more readily understood in connection with the following detailed description of certain preferred embodiments thereof, taken in conjunction with the accompanying drawing wherein:

FIG. 1 shows one embodiment of the electrode mounting in vertical section;
FIG. 2 shows a top view of the rod support in a section of FIG. 1 along line II—II;
FIG. 3 shows the stuffing box in a section of FIG. 1 along line III—III;
FIG. 4 is a section of FIG. 1 along line IV—IV;
FIG. 5 is a fragmentary sectional view similar to FIG. 1 and showing the top portion of a modification of the electrode mounting;
FIG. 6 is a section of FIG. 5 along line VI—VI;
FIG. 7 is a section of FIG. 5 along line VII—VII.

Referring now to the drawing, like reference numerals in all figures designate like parts. The invention is illustrated in connection with a graphite anode plate which is horizontally mounted in an electrolytic cell. The electrolyte may be, for instance, an alkali or alkaline earth metal chloride and the cathode may be of mercury. The invention is concerned only with the means for conducting current to the graphite anode and for maintaining the anode in position in the cell, wherefore the drawing has been accordingly limited to the current conducting and electrode holding means.

As shown in FIG. 1, the graphite anode plate 14 is held in position within the electrolytic cell by means of metal rod 1 which also serves as a current conductor to the anode. For this purpose, the outer end of metal rod 1 is attached to a terminal 19 which may be clamped about the rod end in the usual manner, terminal 19 receiving electric current through cable 20 from a power source (not shown). The current conducting and electrode holding rod 1 is preferably of copper.

A threaded bushing 2, preferably of steel, is brazed to the metal rod 1 near its upper or outer end, leaving a sufficient end portion to enable the electric terminal 19 to be connected to the rod. A hexagonal nut 5 threadedly engages bushing 2, bushing 2 and nut 5 being axially reciprocable in relation to each other to form a means for vertically adjusting the position of the anode 14 in the electrolytic cell. The adjustment nut 5 is rotatably mounted on the cell cover 21 in the following manner:

The nut is attached to a support member 7 which is a channel iron of U-shape whose legs 7a are fixedly secured, for instance by welding, to a sheet metal member 23 having two end flanges 23a. The cell cover 21 has two or more spaced ribs 22 to which the flanges 23a are fixedly attached, for instance by means of pairs of screws 24.

Channel iron 7 has a central aperture 25 permitting the threaded bushing 25 freely to pass therethrough. The adjustment nut 5 has a flange 5a which enables the nut to be retained on support member 7 by means of a retaining ring 6 which engages the flange of the nut. A complementary ring 18 is interposed between the retaining ring 6 and the upper surface 7b of the channel iron, the bipartite retaining means 6, 18 being fastened to surface 7b by means of screws 26 and nuts 27, or like fastening means. A plurality of electrodes may be supported in the same manner by the channel iron 7.

Rotation of rod 1 in respect of support member 7 is prevented by providing a longitudinally extending groove 3 in the surface of the threaded bushing 2 and a key member 4 in ring 18, the key member engaging groove 3 to lock the rod 1 against rotation. As shown more fully in FIG. 3, it is preferred not to make key member 4 integral with ring 18 but to provide the ring with a radial slot in which the key member is mounted, being held in position by screw 26.

It will be obvious from the above description, that rotation of nut 5 in the fixed bearing provided by retaining means 6, 18 will cause the rod 1 to be moved in the direction of its axis.

In accordance with the invention, the copper rod 1 is surrounded by a sleeve 8. The sleeve may be made of any suitable rigid, heat-insulating material which is inert to the electro-chemical reaction in the cell and, more particularly, which is not attacked by chlorine if the electrolyte includes a chloride. Preferably, the sleeve material should also be an electrical insulator. Porcelain or hard plastics have been found useful for the purpose. The protective sleeve 8 is held on the lower or inner end of the metal rod 1 by means of a knurled nut 16 arranged on the threaded bushing 2, on the one hand, and a cam ring 10 brazed to the inner end of the rod, on the other hand. Asbestos washers 9 and 17 are interposed between ring 10 and nut 16, respectively. Washer 17 assures an even pressure distribution on sleeve 8.

Cam ring 10 must be electrically conductive and is preferably also of copper.

As shown in FIGS. 1 and 2, an annular expansion chamber 29 is provided between copper rod 1 and protective sleeve 8.

In assembling the electrical conductor and electrode holding means 1, 10 with the electrode plate 14, it will be advantageous to hold the plate in a fixed position while holding rod 1 in a vertical position in alignment with a suitable recess 30 in the electrode plate, which recess receives the inner end of the rod with cam ring 10. During assembly, the rod must be axially and rotatably movable for the reasons set forth hereinbelow.

As shown in FIG. 2, the central recess 30 of the anode plate 14 has four grooves 31 fitting the ribs 32 of cam ring 10 and permitting the assembled rod and cam ring to be placed into the recess 30. The guide grooves 31 are defined by arcuate projections 33 which radially extend from the anode plate into recess 30 but do not reach to the bottom of the recess so as to leave a widened bottom portion of a diameter sufficient to receive the ribs 32 when the rod and cam ring are turned by 45° to assume the position shown in FIG. 2. In this position, the projections 33 will engage ribs 32 and prevent them from being axially removed from the recess.

Before the rod with its cam ring 10 is introduced into the central recess of the anode plate, the graphite defining the seat for the cam ring 10 and the cam ring are prepared for soldering and preheated. An accurately metered amount of tin solder is then placed into the recess 30, the rod is moved axially into the recess, being guided by grooves 31 during its axial movement, and then turned by 45° so that the ribs 32 engage projections 33 to assume the illustrated position.

Before the tin solder has solidified, the proper positioning of the groove 3 in relation to anode 14 is assured by suitable means. After the solder has solidified and the rod is thus fixed on the anode, the asbestos washer 9 is placed in position, the porcelain or like sleeve 8 is slid over rod 1 and nut 16 with its washer 17 is screwed home to secure the sleeve 8 on the rod in the illustrated position. Finally, the sleeve 8 is further secured in the recess 30 of the graphite plate 14 by applying a suitable packing 15 which should be inert to chlorine, acid-proof and non-oxidizing under acid conditions. A self-hardening, synthetic resin which is abrasion-resistant and has the named properties, has been found effective as a material for packing 15.

The protective sleeve 8 preferably has a smooth or glazed surface, only its lower portion being roughened to assure a firm bond between the sleeve and cement packing 15. Preferably, graphite plate 14 is also impregnated in a known manner near the recess 30 so that it is impermeable to the electrolyte and chlorine.

The anode with its support and conductor is mounted in the cell cover in the following manner:

As shown the cell cover consists of a sheet metal plate 21, which may be of steel, for instance, and which is lined with a corrosion resistant layer 34, for instance of rubber or a suitable synthetic resin. The cover defines a port 35 which is also lined by layer 34 which is folded over to form the rim 34a for the port. Port 35 receives the stuffing box or bushing 13 which must also be resistant to the electrolyte in the cell and may be of the same or similar material as protective sleeve 8. The stuffing box is secured in the port by suitable fastening means, such as bolts 36, a resilient washer 37, for instance of rubber, being interposed between the stuffing box and the rim 34a of port 35. A mounting ring 12 is provided between the stuffing box and the nuts of bolts 36.

After the anode plate has been assembled with its rod support including the protective sleeve 8, this assembly is mounted in the cover by introducing sleeve 8 through the central bore of stuffing box 13 and a gland 11, for instance of steel or cast iron, is fixed in position on the stuffing box by suitable fastening means, for instance bolts 28. A gasket 11a, for instance of rubber, is placed between gland 11 and the stuffing box. It will be noted that there is sufficient radial play between sleeve 8 and the stuffing box bore to permit axial displacement of the sleeve and thus permit the anode to be adjusted in the cell.

The entire assembly is held in position and axially adjustable by nut 5 which engages the threaded bushing 2 of rod 1.

When it is desired to change the anode plate, the mounting is disassembled in the reverse order of its above-described assembly, i.e. the terminal 19 is removed from the rod 1, the two nuts 28 are loosened, the nut 5 is turned till the rod is pressed out of the stuffing box 13. Later the rod 1 with sleeve 8 of the weared electrode 14 are dismantled in the following way:

The cement packing 15 is milled away and after the nut 16 is removed, the protective sleeve 8 can be pulled off the rod. The ring 10 is removed from the anode plate by melting the solder, turning the ring 45° and pulling it out of recess 30 with rod 1. Thus, the entire mounting is ready to be re-used with another anode.

Except for a modified support for adjusting nut 5, the embodiment of FIGS. 5 to 7 is identical with that of FIGS. 1 to 4 and identical reference numerals are used for identical parts to eliminate a description of these identical parts.

Obviating ribs 22 for supporting the platform 7 for nut 5, the annular support platform 18a for nut 5 is cast in a single piece with stuffing box retaining ring 12a, a dome-shaped portion 47 connecting element 18a and element 12a to form an integral unit of cast iron, for instance. This unit is fixed to the stuffing box in the same manner as the ring 12 is mounted in the embodiment of FIGS. 1 to 4. Also, the gland 11a is bolted to the stuffing box in a similar manner. The platform 18a has a radial slot for holding a key member 4a in a manner corresponding to the mounting of member 4 in FIGS. 1 to 4.

Since this modification is otherwise constructed and functions identically with the above-described embodiment, a further description is not required.

An electrode mounting of this type has many advantages among which are the following:

(1) The voltage loss in the conductor rod is many times smaller than the voltage loss in conventional graphite rods used for supporting anode plates in electrolytic cells. No increase in resistance is encountered during the entire operating life of the graphite plate.

(2) Mounting and dismounting are relatively simple and all mounting parts may be used over and over.

(3) The adjustment means for the graphite plate is combined with the current conducting means in a particularly simple manner.

(4) While the smooth surface of the protective sleeve makes the current conducting rod assembly readily glidable through the stuffing box, it simultaneously prevents the formation of salt crusts on the surface.

(5) The metallic conductor is safely protected against chemical and/or electrolytical attack over its entire length as well as at the point where it joins the graphite anode.

(6) The mounting also is safe against the consequences of short circuits. Thus, if conductor rod 1 becomes hot due to a short circuit, this heat is not transmitted to the stuffing box or other parts of the mounting. Furthermore, the provision of an annular expansion chamber between the rod and its protective sleeve makes it possible for the rod to expand without damaging the sleeve. Even if the heat becomes so intense that it melts the solder between cam ring 10 and graphite plate 14, the anode plate will still remain suspended on the rod because of the bayonet lock provided by ribs 32 and projections 33.

While the invention has been described in connection with one specific embodiment and a modification thereof, it will be clearly understood that many variations of the structure may occur to the skilled in the art, particularly after benefiting from this teaching, without departure from the spirit and scope of the present invention as defined in the appended claims.

We claim:

1. A mounting for a substantially horizontal graphite electrode plate of an electrolytic cell having a cover, comprising a metallic current conductor and electrode support rod having an upper end and a lower end, the lower end including an outwardly projecting flange extending into a recess in the electrode plate, said flange having a plurality of peripheral projections and said recess having an undercut rim forming inwardly directed projections, said projections of said flange and of said rim constituting a bayonet lock, soldering means for conductively joining said flange and the graphite electrode plate at said bayonet lock, the upper rod end extending through a port in the cell cover outwardly of the cell, a rigid protective sleeve having a lower end and an upper end short of the upper rod end, the protective sleeve surrounding the conductor and defining an annular expansion chamber therewith, said sleeve being of a heat-insulating material which is substantially inert to fluids in the cell, the lower end of the protective sleeve bearing on said flange and being joined to the graphite electrode plate by a cement filling a widening of said recess and being substantially inert to the fluids in the cell, the upper sleeve end extending through the cell cover port, and a nut screwed on a screw threaded portion of said rod and bearing on the other end of said sleeve for holding the protective sleeve in fixed position in relation to the rod.

2. A mounting for a substantially horizontal graphite electrode plate of an electrolytic cell having a cover, comprising a metallic, conductor rod carrying said electrode plate, the upper end of said rod extending through a port in the cell cover, the lower end of said rod including an outwardly extending horizontal flange engaging in a recess of said electrode plate and solder means bonding said flange to said plate within said recess.

3. A mounting as in claim 2, said flange including a plurality of peripheral projections and said recess having an undercut rim forming a plurality of inwardly directed projections, said projections of said flange interlocking with said projections of said rim so as to constitute a bayonet lock, said solder means filling interstices between said flange and said rim.

4. A mounting as in claim 2, further comprising a sleeve of a heat insulating material substantially inert to fluids in said cell, said sleeve surrounding the lower portion of said rod and extending above said cell cover and bearing with its lower end on said flange of said rod, and means in engagement with said rod and the upper end of said sleeve to hold said sleeve secured to said rod in its position on said flange.

5. A mounting as in claim 4, the outside of said sleeve being smooth except for the lower end which is roughened, further comprising a cement mass engaging in a widening of said recess of said plate and surrounding the lower end of said sleeve so as to bond the latter to said plate.

References Cited in the file of this patent
UNITED STATES PATENTS

| 2,328,665 | Munson | Sept. 7, 1943 |
| 2,627,501 | Gardiner | Feb. 3, 1953 |
| 2,910,423 | Schirmer | Oct. 27, 1959 |